(12) United States Patent
Merritt et al.

(10) Patent No.: US 9,667,042 B2
(45) Date of Patent: May 30, 2017

(54) WIRE SUPPORT MEMBER FOR AN ENVIRONMENTAL CONTROL SYSTEM

(71) Applicant: Hamilton Sundstrand Corporation, Windsor Locks, CT (US)

(72) Inventors: Brent J. Merritt, Southwick, MA (US); Kenneth Crawford, Manchester, CT (US); John Perella, Monson, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 108 days.

(21) Appl. No.: 14/619,585

(22) Filed: Feb. 11, 2015

(65) Prior Publication Data

US 2016/0233654 A1  Aug. 11, 2016

(51) Int. Cl.
*H02G 3/02* (2006.01)
*H02G 3/32* (2006.01)

(52) U.S. Cl.
CPC ............. *H02G 3/02* (2013.01); *H02G 3/32* (2013.01)

(58) Field of Classification Search
CPC .......................................................... B60H 1/34
USPC .......................................................... 174/72 A
See application file for complete search history.

(56) References Cited

U.S. PATENT DOCUMENTS

| | | | |
|---|---|---|---|
| 2,382,970 A | 8/1945 | Borcherdt | |
| 2,419,761 A * | 4/1947 | Bruce | F16L 3/227 248/68.1 |
| 2,447,152 A | 8/1948 | Baker | |
| 3,151,905 A | 10/1964 | Reuther et al. | |
| 3,689,193 A | 9/1972 | Riehl | |
| 3,705,949 A * | 12/1972 | Weiss | H02G 3/045 174/101 |
| 4,097,012 A | 6/1978 | McIntyre | |
| 4,234,012 A | 11/1980 | Schupback | |
| 4,654,967 A * | 4/1987 | Thenner | H01R 43/28 174/72 A |
| 4,775,286 A | 10/1988 | Gillette et al. | |
| 5,105,054 A | 4/1992 | Kirma | |
| 5,452,871 A | 9/1995 | Sauber | |
| 5,587,555 A * | 12/1996 | Rinderer | F16L 3/22 174/154 |
| 5,597,980 A * | 1/1997 | Weber | H02G 3/0418 123/143 C |
| 5,598,795 A | 2/1997 | House | |
| 5,918,837 A * | 7/1999 | Vicain | F16L 3/1226 174/135 |
| 6,230,585 B1 | 5/2001 | Bator | |
| 6,903,275 B1 * | 6/2005 | Jetton | B60R 16/0215 174/503 |
| 7,014,152 B2 | 3/2006 | Grendahl | |

(Continued)

*Primary Examiner* — William H Mayo, III
*Assistant Examiner* — Krystal Robinson
(74) *Attorney, Agent, or Firm* — Kinney & Lange, P.A.

(57) ABSTRACT

A wire support member for an environmental control system, the wire support member has a first bracket with inner and outer surfaces and a second bracket with inner and outer surfaces. A bracket connecter is disposed between and connects the first bracket and the second bracket. A ratio between the thickness of the first bracket and an offset between the first inner surface and the second inner surface optimizes the position of a wire harness and prevents the wire harness from contacting other surfaces within the aircraft.

8 Claims, 3 Drawing Sheets

(56) References Cited

U.S. PATENT DOCUMENTS

| | | | |
|---|---|---|---|
| 7,285,027 B2 * | 10/2007 | McGrath | H02G 3/0406 439/719 |
| 7,507,906 B2 | 3/2009 | Suzuki | |
| 7,905,454 B2 | 3/2011 | Sanatgar et al. | |
| 8,113,472 B2 | 2/2012 | Wippler et al. | |
| 8,541,682 B2 * | 9/2013 | Mazelle | H02G 3/32 174/68.1 |
| 8,668,173 B2 | 3/2014 | Knobloch | |
| 8,876,073 B2 | 11/2014 | Richey | |
| 8,921,699 B2 * | 12/2014 | Al-Ali | 174/113 R |
| 8,979,056 B2 | 3/2015 | Mayo et al. | |
| 9,236,720 B2 | 1/2016 | Ichikawa et al. | |
| 9,273,719 B2 | 3/2016 | Grifka | |
| 9,353,890 B2 | 5/2016 | Dickinson et al. | |
| 2005/0217888 A1 * | 10/2005 | Arai | H02G 3/0487 174/72 A |
| 2006/0178246 A1 * | 8/2006 | Tjerrild | F16L 3/133 482/24 |
| 2007/0257160 A1 | 11/2007 | Cushion | |
| 2008/0169675 A1 | 7/2008 | Hebert | |
| 2009/0173844 A1 | 7/2009 | Huo | |
| 2009/0230243 A1 | 9/2009 | Army et al. | |
| 2010/0032531 A1 | 2/2010 | Getts | |
| 2012/0091292 A1 | 4/2012 | Hahn et al. | |
| 2012/0325983 A1 | 12/2012 | Vrame | |
| 2013/0140055 A1 | 6/2013 | Adachi et al. | |
| 2013/0161940 A1 | 6/2013 | Rossato et al. | |
| 2013/0292159 A1 * | 11/2013 | Gotou | H01B 7/0045 174/250 |
| 2013/0320155 A1 | 12/2013 | Okabe | |
| 2013/0323473 A1 | 12/2013 | Dietsch et al. | |
| 2013/0344790 A1 | 12/2013 | Army et al. | |
| 2014/0158454 A1 | 6/2014 | Kikuta | |
| 2014/0306071 A1 | 10/2014 | Stechmann | |
| 2014/0326836 A1 | 11/2014 | Kim et al. | |
| 2014/0332639 A1 | 11/2014 | Ahlem et al. | |
| 2016/0066473 A1 | 3/2016 | Tsuboi et al. | |
| 2016/0161052 A1 | 6/2016 | Griggs | |

* cited by examiner

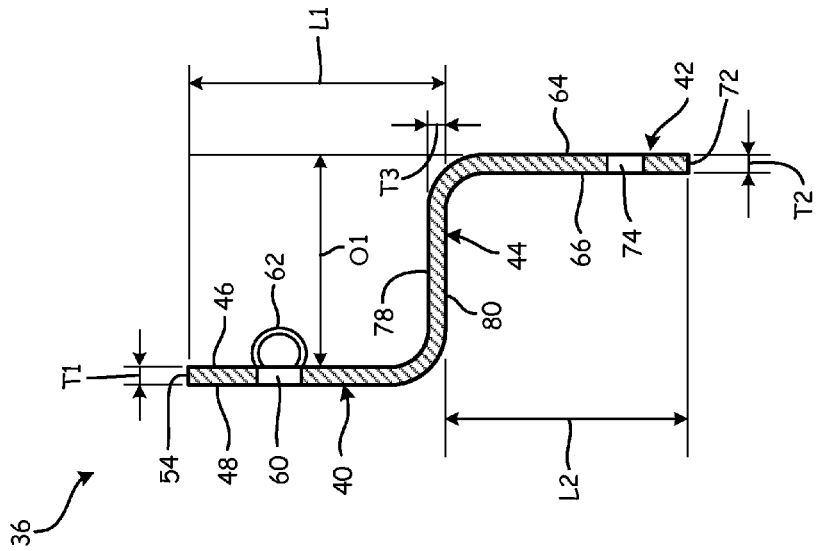
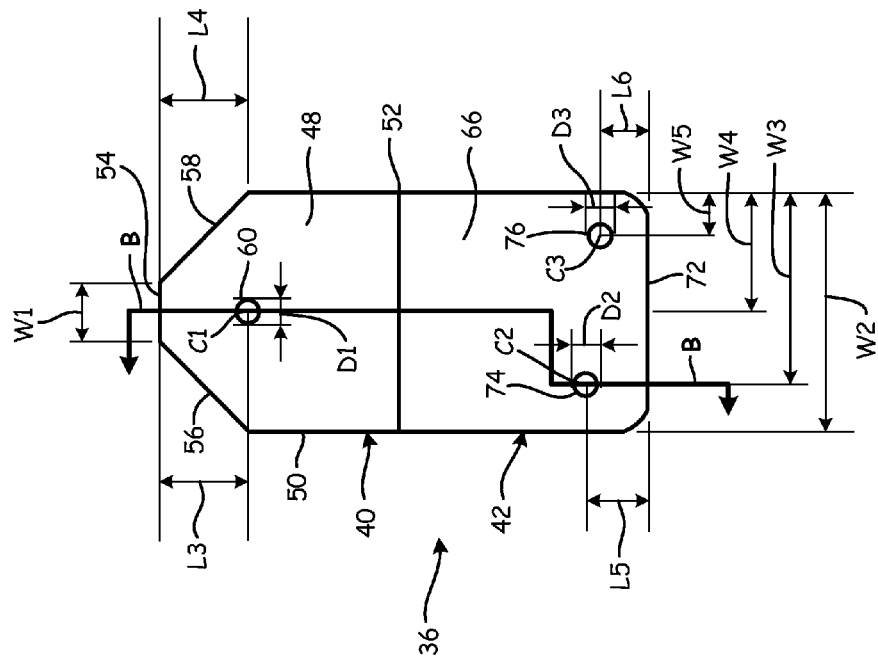
Fig. 3B
Fig. 3A

WIRE SUPPORT MEMBER FOR AN ENVIRONMENTAL CONTROL SYSTEM

BACKGROUND

The present disclosure relates to aircraft environmental control systems (ECS), and more specifically to mounting systems for components of an ECS. An ECS utilizes cabin air compressors to condition air for delivery to an aircraft cabin. The pressure and temperature of the aircraft cabin must be maintained throughout a wide variety of flight conditions. A pack control unit (PCU) communicates with and receives feedback from cabin air compressor modules to ensure that the temperature and pressure of the aircraft cabin remains at sufficient levels. The PCU communicates with the cabin air compressor modules through wiring that is routed from the PCU to each module. The wiring must be routed and supported such that the wiring will not interfere with other parts of the ECS and will not wear through.

SUMMARY

According to an embodiment of the present invention, a wire support member for an environmental control system includes a first bracket a second bracket and a bracket connector. The first bracket has a first inner surface, a first outer surface, and a thickness T1. The second bracket has a second inner surface, a second outer surface, and a thickness T2. An offset O1 between the first inner surface and the second inner surface is between 1.690 inches (4.292 centimeters) and 1.810 inches (4.598 centimeters). The bracket connector is disposed between and connects the first bracket and the second bracket.

According to another embodiment of the present invention, a wire support assembly for an environmental control system includes a wiring for the environmental control system, a first wire support member, a second wire support member, and a third wire support member. The wiring includes a first wire bundle extending from a pack control unit and branching into a second wire bundle and a third wire bundle, the second wire bundle extends from the first wire bundle to an outboard module, and the third wire bundle extends from the first wire bundle to an inboard module. The first wire support member is mounted to a first backbone support structure and supports the first wire bundle, the second wire bundle, and the third wire bundle. The second wire support member is mounted to an outboard support structure of the outboard module and supports the second wire bundle between the first wire support member and the outboard module. The second wire support member includes a first bracket having a first inner surface, a first outer surface, and a thickness T1, a second bracket having a second inner surface, a second outer surface, and a thickness T2, an offset O1 between the first inner surface and the second inner surface, and a bracket connector disposed between and connecting the first bracket and the second bracket. The offset O1 is between 1.690 inches (4.292 centimeters) and 1.810 inches (4.598 centimeters). The third wire support member is mounted to a first compressor casing of the inboard module and supports the third wire bundle between the first wire support member and the inboard module.

BRIEF DESCRIPTION OF THE DRAWINGS

FIG. 3A is a plan view of a wire support member.

FIG. 3B is a cross-sectional view of a wire support member taken along line B-B of FIG. 3A.

DETAILED DESCRIPTION

Figure 1:
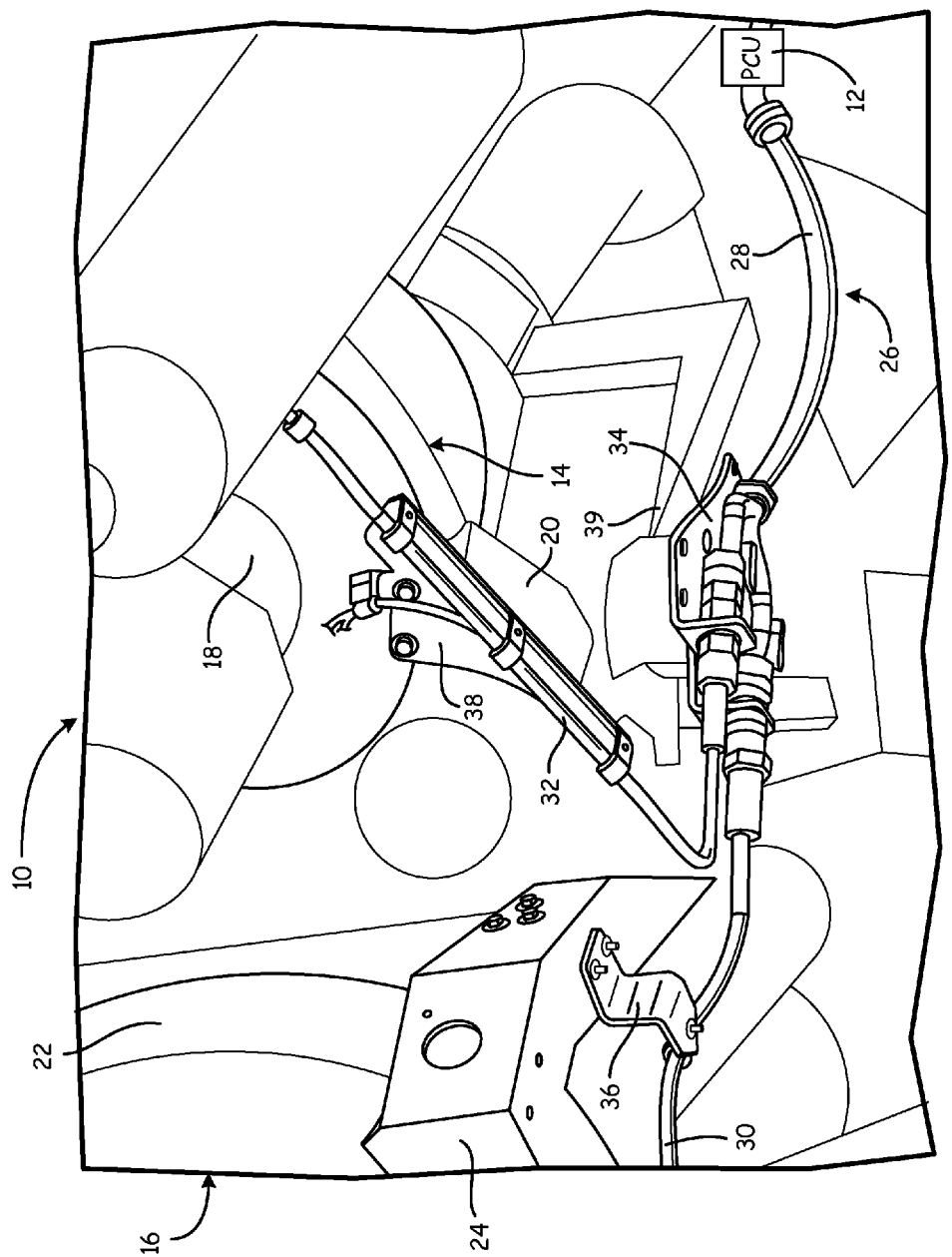
FIG. 1 is a perspective view of a wire harness support system for an aircraft environmental control system.

FIG. 1 is a perspective view of a wire harness support system for an aircraft environmental control system (ECS) 10. ECS 10 includes pack control unit 12 (PCU), inboard module 14, and outboard module 16. Inboard module 14 includes inboard cabin air compressor 18 and module support structure 20. Outboard module 16 includes outboard cabin air compressor 22 and module support structure 24. ECS 10 also includes wiring 26 extending from PCU 12 to inboard module 14 and outboard module 16. Wiring 26 includes first wire harness 28, second wire harness 30, and third wire harness 32. Wiring 26 is supported by first wire support member 34, second wire support member 36, and third wire support member 38. ECS 10 further includes backbone support structure 39 for supporting ECS 10 and various other modules of ECS 10.

First wire harness 28 is connected to PCU and supported by first wire support member 34. First wire harness 28 splits to form second wire harness 30 and third wire harness 32. Both second wire harness 30 and third wire harness 32 are supported by first wire support member 34. Second wire harness 30 is connected to, and extends from, first wire harness 28, and second wire harness 30 is also connected to outboard module 16. As second wire harness 30 proceeds from first wire support member 34 to outboard module 16, second wire harness 30 is supported by second wire support member 36. First wire support member 34 is mounted to backbone support structure 39 and optimizes the routing of first wire harness 28, second wire harness 30, and third wire harness 32. Second wire support member 36 is mounted to module support structure 24 and optimizes the routing of second wire harness 30. Third wire support member 38 is mounted to a housing of inboard module 14 and optimizes the routing of third wire harness 32.

Similar to second wire harness 30, third wire harness 32 is connected to and extends from first wire harness 28. Third wire harness 32 extends from first wire harness 28 to inboard module 14. Third wire harness 32 is supported by third wire support member 38 as third wire harness 32 proceeds from first wire support member 34 to inboard module 14. As third wire harness 32 proceeds along third wire support member 38, third wire harness 32 splits to include a main bundle and a secondary bundle. Both the main bundle and the secondary bundle are supported by and routed by third wire support member 38.

Second wire support member 36 is mounted to module support structure 24 of outboard module 16. Fasteners extend through fastener openings (best seen in FIG. 2) of second wire support member 36 and into module support structure 24. Second wire support member 36 supports second wire harness 30 and optimizes the routing of second wire harness 30 to outboard module 16, which prevents second wire harness 30 from inadvertently contacting various components of ECS 10 that may have an effect on the operation of second wire harness 30. Mounting second wire support member 36 to module support structure 24 ensures a secure mounting surface for second wire support member 36 and allows for efficient routing of second wire harness 30 as second wire harness 30 is being routed to outboard module 16, which is supported by module support structure 24.

Figure 2:
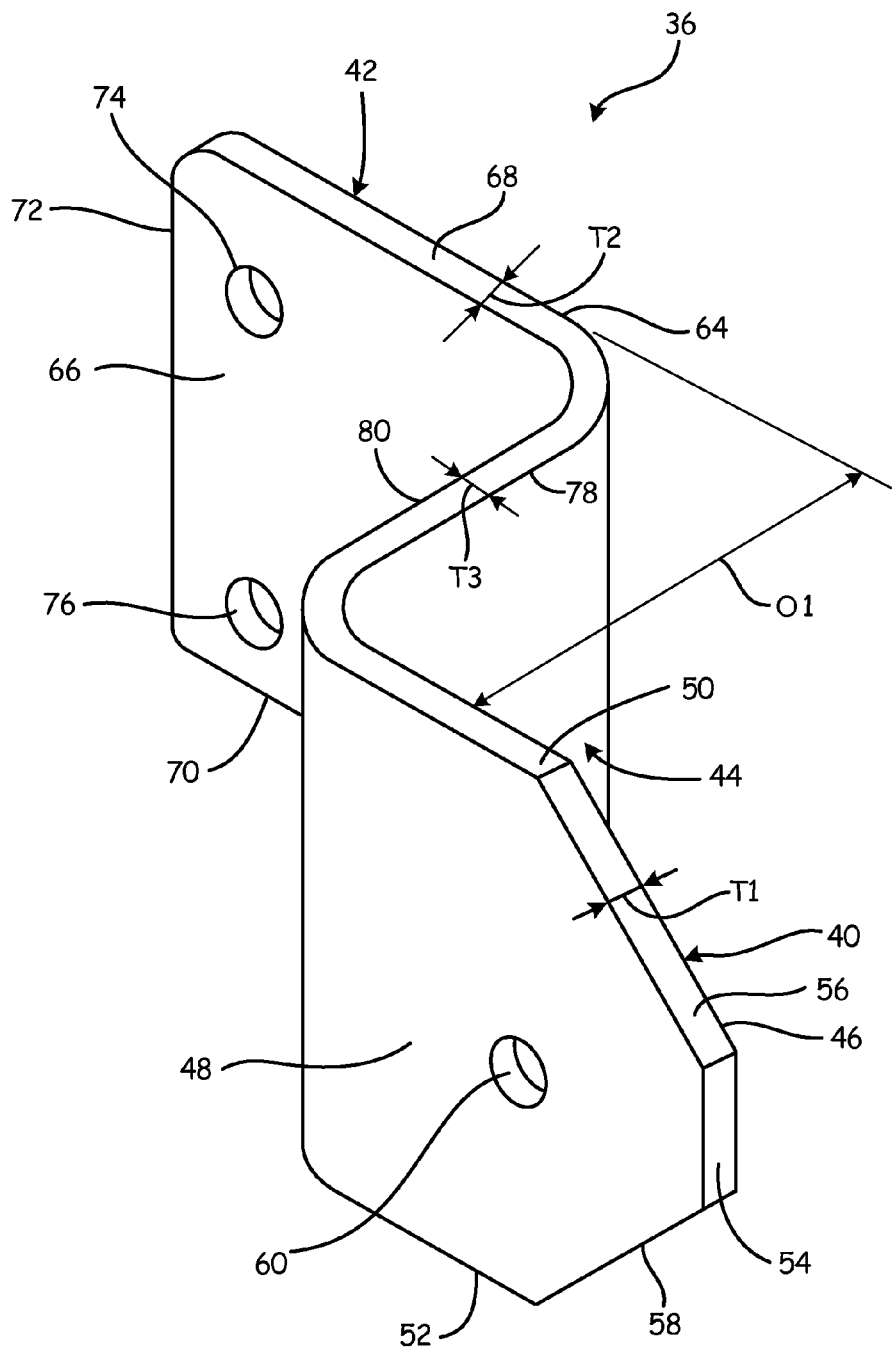
FIG. 2 is a perspective view of a wire support member.

FIG. 2 is a perspective view of second wire support member 36. Second wire support member 36 includes first bracket 40, second bracket 42, and bracket connector 44. First bracket 40 includes first inner surface 46, first outer surface 48, first edge 50, second edge 52 and thickness T1. First bracket 40 further includes distal end 54 opposite bracket connector 44, first chamfer 56, second chamfer 58, and fastener opening 60. Clamp 62 (shown in FIG. 3B) is secured to first inner surface 46 at fastener opening 60. Second bracket 42 includes second inner surface 64, second outer surface 66, first edge 68, second edge 70, free end 72 opposite bracket connector 44, and thickness T2. Second bracket 42 also includes fastener openings 74 and 76. Bracket connector 44 includes first side 78, second side 80, and thickness T3. Second wire support member 36 also includes offset O1 between first inner surface 46 and second inner surface 64.

As second wire harness 30 is routed from first wire support member 34 to outboard module 16, second wire harness 30 must be supported and routed to ensure that second wire harness 30 does not experience excessive wear due to contact with various parts of environmental control system 10. Second bracket 42 is secured to module support structure 24 by fasteners extending though fastener openings 74, 76 (best seen in FIG. 1). Second wire support member 36 routes second wire harness 30 away from first wire support member 34, and prevents second wire harness 30 from contacting third wire harness 32 as both second wire harness 30 and third wire harness 32 exit first wire support member 34. Additionally, second wire support member 36 retains second wire harness 30 is such a position that second wire harness 30 does not contact any of the various parts of outboard module 16 as second wire harness 30 transitions between first wire support member 34 and outboard module 16.

Second wire support member 36 is made from a lightweight material to reduce the weight impact on the aircraft caused by second wire support member 36, the lightweight material being sufficiently rigid to support the wiring throughout the flight envelope of the aircraft. Second wire support member 36 may be coated or uncoated. In the present embodiment, second wire support member 36 is made from aluminum. It is understood, however, that second wire support member 36 may be made of any suitable material for supporting and routing the wiring throughout the flight envelope of the aircraft without having a significant weight impact on the aircraft, such as titanium or carbon fiber. First chamfer 56 and second chamfer 58 are configured to reduce the weight of second wire support member 36 without impacting the structural integrity of second wire support member 36. First chamfer 56 and second chamfer 58 also eliminate any sharp angles that may have had an effect on the performance of second wire harness 30.

FIG. 3A is a plan view of second wire support member 36. FIG. 3B is a cross-sectional view of second wire support member 36 taken along line B-B of FIG. 3A. FIGS. 3A and 3B will be discussed together. Second wire support member 36 includes first bracket 40, second bracket 42, and bracket connector 44. First bracket 40 includes first inner surface 46, first outer surface 48, first edge 50, second edge 52, and thickness T1. First bracket 40 further includes distal end 54 opposite bracket connector 44, first chamfer 56, second chamfer 58, and fastener opening 60. Fastener opening 60 includes center C1 and diameter D1. Clamp 62 (shown in FIG. 3B) is secured to first inner surface 46. Second bracket 42 includes second inner surface 64, second outer surface 66, first edge 68, second edge 70, free end 72, and thickness T2. Second bracket 42 also includes fastener openings 74 and 76. Fastener opening 74 includes center C2 and diameter D2. Fastener opening 76 includes center C3 and diameter D3. Bracket connector 44 includes first side 78, second side 80, and thickness T3.

While first bracket 40 is described as including clamp 62, it is understood that any suitable retaining mechanism for routing second wire harness 30 that will not cause wear damage to second wire harness 30 may be utilized. Clamp 62 may also include a cushion, such as a cushion made from an elastomer material, disposed between clamp 62 and second wire bundle 30 to prevent clamp 52 from having an effect on the operation of second wire harness 30. Additionally, second wire support member 36 is secured to module support structure 24 by fasteners extending though fastener openings 74, 76.

Offset O1 is a distance between first inner surface 46 and second inner surface 64. Length L1 is a distance from distal end 54 to second side 80 of bracket connector 44. Length L2 is a distance between free end 72 of second bracket 42 and second side 80. Length L3 is a distance between center C1 and distal end 54. Length L4 is a distance between an edge of second chamfer 58 and distal end 54. Length L5 is a distance from free end 70 to center C2. Length L6 is a distance from free end 72 to center C3. Width W1 is a width of distal end 54 between first chamfer 56 and second chamfer 58. While width W1 is described as spanning between first chamfer 56 and second chamfer 58, it is to be understood that width W1 may vary between zero, where first chamfer 56 and second chamfer 58 meet to form a point, and a full width of first bracket 40. Width W2 is a distance from first edge 68 and second edge 70 of second bracket 42. Width W3 is a distance from second edge 70 to center C2. Width W4 is a distance from second edge 70 to a centerline of second wire support member 30. Width W5 is a distance from second edge 70 to center C3.

Thickness T1 is between 0.119 inches (0.302 centimeters) and 0.131 inches (0.333 centimeters). Thickness T2 is between 0.119 inches (0.302 centimeters) and 0.131 inches (0.333 centimeters). Thickness T3 is similarly between 0.119 inches (0.302 centimeters) and 0.131 inches (0.333 centimeters). Offset O1 is between 1.690 inches (4.292 centimeters) and 1.810 inches (4.598 centimeters). A ratio of offset O1 to thickness T1 is between 12.9 and 15.3. Similarly, a ratio of offset O1 to thickness T2 is between 12.9 and 15.3.

Length L1 is between 2.040 inches (5.181 centimeters) and 2.160 inches (5.487 centimeters). Length L2 is between 1.965 inches (4.991 centimeters) and 2.085 inches (5.296 centimeters). Length L3 is between 0.735 inches (1.867 centimeters) and 0.715 inches (1.816 centimeters). Length L4 is between 0.780 inches (1.982 centimeters) and 0.720 inches (1.828 centimeters). Length L5 is between 0.537 inches (1.364 centimeters) and 0.517 inches (1.313 centimeters). Length L6 is between 0.417 inches (1.060 centimeters) and 0.397 inches (1.008 centimeters). Width W2 is between 2.070 inches (5.258 centimeters) and 2.010 inches (5.105 centimeters). Width W3 is between 1.658 inches (4.212 centimeters) and 1.638 inches (4.160 centimeters). Width W4 is between 1.030 inches (2.617 centimeters) and 1.010 inches (2.565 centimeters). Width W5 is between 0.401 inches (1.019 centimeters) and 0.381 inches (0.967 centimeters).

Second wire support member 36 is mounted to module support structure 24 (shown in FIG. 1). Module support structure 24 locates second wire support structure 34 near outboard module 16. This location reduces the amount of strain imparted on second wire support member 36 by second wire harness 30 by efficiently routing second wire harness 30 from first wire support member 34 to outboard module 16 in such a way that the total length of second wire harness 30 is minimized. Mounting second wire support member 36 to module support structure 24 also ensures that second wire harness 30 and third wire harness 32 do not become entangled as the two wire harnesses exit first wire support member 34. This mounting also allows second wire support member 36 to remain lightweight as second wire support member 36 does not have to carry as heavy of a load.

Second wire support member 36 must be able to support the weight of second wire harness 30 throughout the envelope of flight conditions experienced by the aircraft. Second wire support member 36 must also maintain the routing of second wire harness 30 to ensure that constant communication between outboard module 14 and PCU 12 is maintained. The ratio of offset O1 to thickness T1 optimizes the routing of second wire harness 30. Second wire support member 36 retains second wire harness 30 in a floating position away from other components of environmental control system 10 to prevent second wire harness 30 from rubbing against or interfering with the other components of environmental control system 10. Offset O1 ensures that second wire harness 30 is maintained in the floating position at a location that ensures the integrity of second wire harness 30. The ratio is also configured such that second wire support member 36 routes second wire harness 30 in such a way that second wire harness 30 avoids various components of ECS 10 that may have an adverse effect on second wire harness 30.

The ratio of offset O1 to thickness T1 also ensures that second wire support member 36 is sufficiently lightweight and compact. Similarly, the ratio of offset O1 to thickness T2 also ensures that second wire support member 36 is sufficiently lightweight and compact, which also maintains sufficient structural integrity to allow second wire support member 36 to support second wire harness 30. Thus, while second wire support member 36 has sufficient structural integrity, the ratio also ensures that second wire support member 36 is sufficiently lightweight that second wire support member 36 does not have an adverse weight impact on the aircraft.

Discussion of Possible Embodiments

The following are non-exclusive descriptions of possible embodiments of the present invention.

A wire support member for an environmental control system, the wire support member includes a first bracket having a first inner surface, a first outer surface, and a thickness T1, a second bracket having a second inner surface, a second outer surface, and a thickness T2, an offset O1 between the first inner surface and the second inner surface, a bracket connector disposed between and connecting the first bracket and the second bracket, and wherein the offset O1 is between 1.690 inches (4.292 centimeters) and 1.810 inches (4.598 centimeters).

The wire support member of the preceding paragraph can optionally include, additionally and/or alternatively, any one or more of the following features, configurations and/or additional components:

A further embodiment of the foregoing wire support member, wherein the thickness T1 can be between 0.119 inches (0.302 centimeters) and 0.131 inches (0.333 centimeters).

A further embodiment of any of the foregoing wire support member, wherein the thickness T2 can be between 0.119 inches (0.302 centimeters) and 0.131 inches (0.333 centimeters).

A further embodiment of any of the foregoing wire support member, wherein a ratio between the offset O1 and the thickness T1 can be between 12.9 and 15.3.

A further embodiment of any of the foregoing wire support member, wherein a ratio between the offset O1 and the thickness T2 can be between 12.9 and 15.3.

A further embodiment of the foregoing wire support member, wherein a clamp can be secured to the inner surface.

A further embodiment of any of the foregoing wire support member, wherein the clamp further comprises an elastomer cushion secured within the clamp.

A wire support assembly for an environmental control system, the wire support assembly including a wiring for the environmental control system including a first wire bundle extending from a pack control unit and branching into a second wire bundle and a third wire bundle, the second wire bundle extending from the first wire bundle to an outboard module, and the third wire bundle extending from the first wire bundle to an inboard module, a first wire support member mounted to a first backbone support structure, the first wire support member supporting the first wire bundle, the second wire bundle, and the third wire bundle, a second wire support member mounted to an outboard support structure of the outboard module, the second wire support member supporting the second wire bundle between the first wire support member and the outboard module, the second wire support member comprising, a first bracket having a first inner surface, a first outer surface, and a thickness T1, a second bracket having a second inner surface, a second outer surface, and a thickness T2, an offset O1 between the first inner surface and the second inner surface, a bracket connector disposed between and connecting the first bracket and the second bracket, and wherein the offset O1 is between 1.690 inches (4.292 centimeters) and 1.810 inches (4.598 centimeters), and a third wire support member mounted to a first compressor casing of the inboard module, the third wire support member supporting the third wire bundle between the first wire support member and the inboard module.

The wire support assembly of the preceding paragraph can optionally include, additionally and/or alternatively, any one or more of the following features, configurations and/or additional components:

A further embodiment of the foregoing wire support assembly, wherein the thickness T1 is between 0.119 inches (0.302 centimeters) and 0.131 inches (0.333 centimeters).

A further embodiment of any of the foregoing wire support assemblies, wherein the thickness T2 is between 0.119 inches (0.302 centimeters) and 0.131 inches (0.333 centimeters).

A further embodiment of any of the foregoing wire support assemblies, wherein a ratio between the offset O1 and the thickness T1 can be between 12.9 and 15.3.

A further embodiment of any of the foregoing wire support assemblies, wherein a ratio between the offset O1 and the thickness T2 can be between 12.9 and 15.3.

A further embodiment of any of the foregoing wire support assemblies, wherein the first bracket includes a plurality of fastener openings, and wherein the second wire support member is secured to the second support structure by a plurality of fasteners extending through the fastener openings.

A further embodiment of any of the foregoing wire support assemblies, wherein a clamp is mounted to the second bracket, the second wire bundle is supported by the clamp.

A further embodiment of the foregoing wire support assembly, wherein the clamp includes an elastomer cushion secured between the clamp and the second wire bundle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wire support assembly for an environmental control system, the wire support assembly comprising:
    a wiring for the environmental control system comprising:
        a first wire bundle extending from a pack control unit and branching into a second wire bundle and a third wire bundle;
        the second wire bundle extending from the first wire bundle to an outboard module; and
        the third wire bundle extending from the first wire bundle to an inboard module;
    a first wire support member mounted to a first backbone support structure, the first wire support member supporting the first wire bundle, the second wire bundle, and the third wire bundle;
    a second wire support member mounted to an outboard support structure of the outboard module, the second wire support member supporting the second wire bundle between the first wire support member and the outboard module, the second wire support member comprising:
        a first bracket having a first inner surface, a first outer surface, and a thickness T1;
        a second bracket having a second inner surface, a second outer surface, and a thickness T2;
        an offset O1 between the first inner surface and the second inner surface;
        a bracket connector disposed between and connecting the first bracket and the second bracket; and
        wherein the offset O1 is between 1.690 inches (4.292 centimeters) and 1.810 inches (4.598 centimeters); and
    a third wire support member mounted to a first compressor casing of the inboard module, the third wire support member supporting the third wire bundle between the first wire support member and the inboard module.

2. The wire support assembly of claim 1, wherein the thickness T1 is between 0.119 inches (0.302 centimeters) and 0.131 inches (0.333 centimeters).

3. The wire support assembly of claim 1, wherein T2 is between 0.119 inches (0.302 centimeters) and 0.131 inches (0.333 centimeters).

4. The wire support assembly of claim 1, wherein a ratio between the offset O1 and the thickness T2 is between 12.9 and 15.3.

5. The wire support assembly of claim 1, wherein a ratio between the offset O1 and the thickness T1 is between 12.9 and 15.3.

6. The wire support assembly of claim 1, wherein the first bracket includes a plurality of fastener openings therethrough, the second wire support member secured to the second support structure by fasteners extending through the fastener openings.

7. The wire support assembly of claim 1 further comprising:
    a clamp mounted to the second bracket, the second wire bundle supported by the clamp.

8. The wire support assembly of claim 7, wherein the clamp further comprises an elastomer cushion between the clamp and the second wire bundle.

* * * * *